US008917732B2

(12) United States Patent
Narayanaswamy et al.

(10) Patent No.: US 8,917,732 B2
(45) Date of Patent: Dec. 23, 2014

(54) METHOD OF SELECTIVELY AND SEAMLESSLY SEGREGATING SAN TRAFFIC IN I/O CONSOLIDATED NETWORKS

(75) Inventors: Smitha Narayanaswamy, Bangalore (IN); Ganesan Rajagopal, Bangalore (IN); Sanjay Sane, Fremont, CA (US); Ramana Mellacheruvu, San Jose, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 884 days.

(21) Appl. No.: 12/551,387

(22) Filed: Aug. 31, 2009

(65) Prior Publication Data

US 2010/0165994 A1 Jul. 1, 2010

Related U.S. Application Data

(60) Provisional application No. 61/142,080, filed on Dec. 31, 2008.

(51) Int. Cl.
*H04L 12/54* (2013.01)
*H04L 29/08* (2006.01)
*H04L 29/06* (2006.01)

(52) U.S. Cl.
CPC ........ *H04L 67/1097* (2013.01); *H04L 63/0236* (2013.01)
USPC ....... 370/395.53; 370/401; 709/223; 709/249

(58) Field of Classification Search
None
See application file for complete search history.

(56) References Cited

U.S. PATENT DOCUMENTS

| 6,407,985 | B1 * | 6/2002 | Jain ............................... | 370/256 |
|---|---|---|---|---|
| 6,658,002 | B1 * | 12/2003 | Ross et al. .................... | 370/392 |
| 6,778,547 | B1 * | 8/2004 | Merchant ...................... | 370/422 |
| 7,804,840 | B2 * | 9/2010 | Rupanagunta et al. ....... | 370/401 |
| 2005/0010682 | A1 * | 1/2005 | Amir et al. .................... | 709/238 |
| 2006/0174000 | A1 * | 8/2006 | Graves .......................... | 709/225 |
| 2007/0014301 | A1 * | 1/2007 | Miller et al. .................. | 370/401 |
| 2007/0036178 | A1 * | 2/2007 | Hares et al. ................... | 370/490 |
| 2009/0037977 | A1 * | 2/2009 | Gai et al. .......................... | 726/1 |
| 2009/0292813 | A1 * | 11/2009 | Snively et al. ................ | 709/228 |
| 2010/0182934 | A1 * | 7/2010 | Dobbins et al. ............... | 370/254 |

OTHER PUBLICATIONS

Apicella, Mario, "Cisco Nexus 5000 bridges the network gap. Compact switch seamlessly connects Fibre Channel and Ethernet networks", InfoWorld, Jul. 28, 2008, downloaded from http://www.infoworld.com/t/storage/cisco-nexus-5000-bridges-network-gap-395 on Aug. 28, 2009.

(Continued)

*Primary Examiner* — Marsha D. Banks Harold
*Assistant Examiner* — Matthew Campbell
(74) *Attorney, Agent, or Firm* — Novak Druce Connolly Bove + Quigg LLP

(57) ABSTRACT

Methods and apparatus for segregating traffic are disclosed. In accordance with one embodiment, a traffic splitter identifies a set of links coupled to the traffic splitter, where the set of links includes two or more uplinks, wherein each of the two or more uplinks are implemented in a common physical media. The two or more uplinks include a LAN uplink coupled to a LAN and a SAN uplink coupled to a SAN. The traffic splitter prevents SAN traffic from reaching the LAN via the LAN uplink. In addition, the traffic splitter prevents LAN traffic from reaching the SAN via the SAN uplink.

29 Claims, 6 Drawing Sheets

(56) References Cited

OTHER PUBLICATIONS

"This page contains pointers to all the document presented during the development of FC-BB-5. All these documents have historical significance only, the FC-BB-5 standard obsoletes them." Mar. 2009, Fibre Channel over Ethernet, downloaded from http://fcoe.com/FC-BB-5.htm on Aug. 11, 2009.

"Fibre Channel over Ethernet", downloaded from http://www.t11.org/fcoe on Aug. 11, 2009.

"FCoE—Where It Fits, Why it Will Succeed and How it Benefits You", Fibre Channel over Ethernet—FcoE, Fibre Channel Industry Association (FCIA), downloaded from http://www.fibrechannel.org/FCoE.html on Aug. 11, 2009.

Wilson, Steven et al., "Fibre Channel Backbone—5 (FC-BB-5) Rev 2.00" INCITS working draft proposed American National Standard for Information Technology, Jun. 4, 2009.

DeSanti, Claudio; Project Proposal for a New INCITS Standard Fibre Channel-Backbone-6; FC-BB-6 Project Proposal, T11/09-282v1, Jun. 2009 (4 pages).

* cited by examiner

METHOD OF SELECTIVELY AND SEAMLESSLY SEGREGATING SAN TRAFFIC IN I/O CONSOLIDATED NETWORKS

RELATED APPLICATIONS

This application claims priority from U.S. Provisional Application No. 61/142,080, entitled "Methods and Apparatus for Selectively and Seamlessly Segregating SAN traffic in I/O Consolidated Networks," filed on Dec. 31, 2008, by Narayanaswamay et al, which is incorporated herein by reference for all purposes.

BACKGROUND

1. Technical Field

The present disclosure relates generally to methods and apparatus for segregating different types of traffic in a converged SAN network.

2. Description of the Related Art

Layer 2 input/output (I/O) consolidation is the aggregation of multiple types of network traffic on a single physical link (e.g., Ethernet link). Specifically, I/O consolidation may be performed to support regular data/IP traffic, storage traffic, and Inter-process communication (IPC) for high performance computing (HPC).

I/O consolidation on a network device such as a server (i.e., host) is a highly desired feature in data center networks, since it provides advantages such as lower power requirements, lower cost, easier management and simpler physical wiring. While I/O consolidation provides significant advantages over multiple individual physical links at the network device, the unification of Local Area Network (LAN) and Storage Area Network (SAN) traffic in networks brings its own disadvantages.

DESCRIPTION OF EXAMPLE EMBODIMENTS

Figure 1:
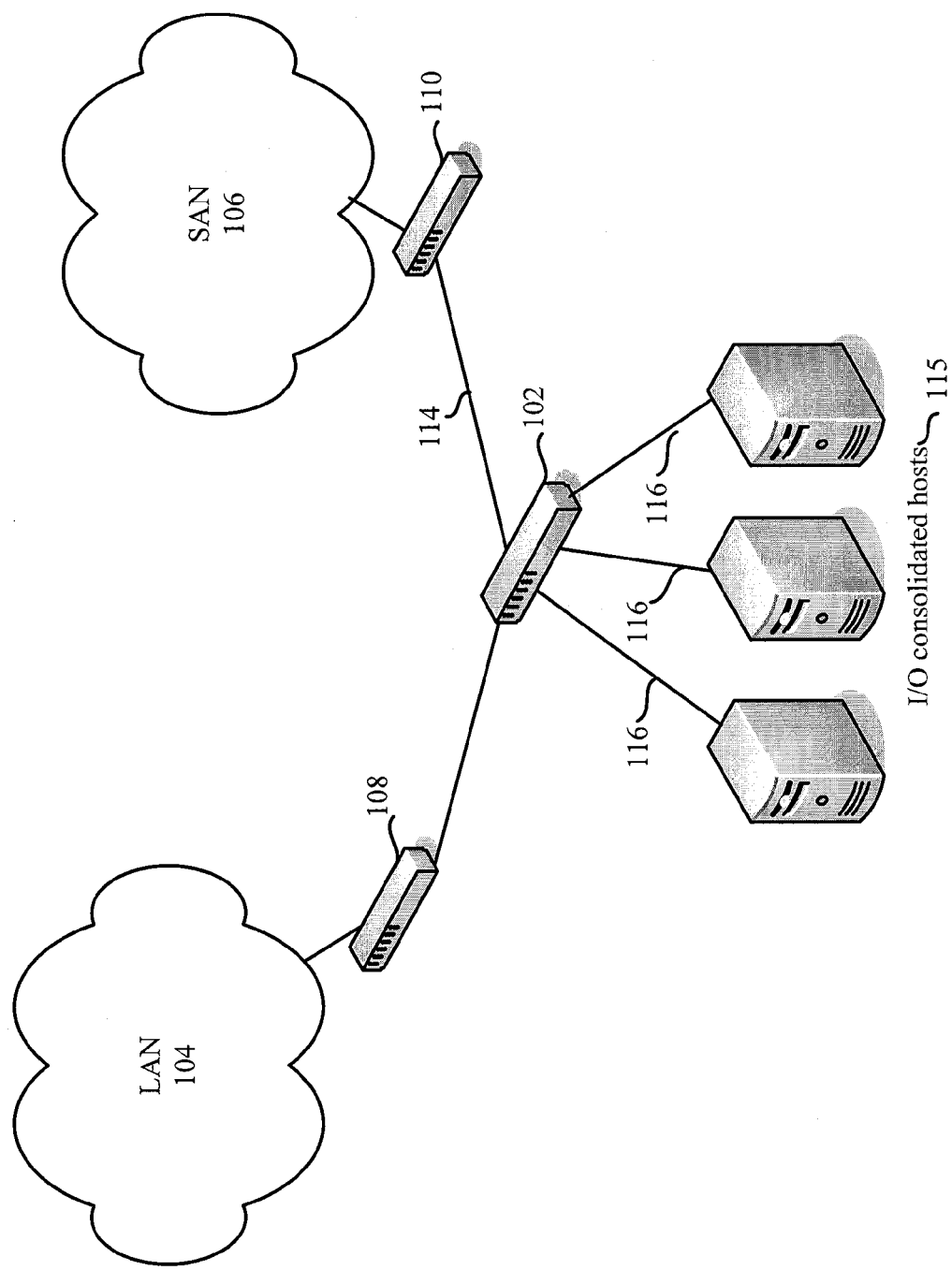
FIG. 1 is a block diagram illustrating an example system in which various embodiments may be implemented.

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

Overview

In one embodiment, a traffic splitter identifies a set of links coupled to the traffic splitter, where the set of links includes two or more uplinks, wherein each of the two or more uplinks is implemented in a common physical media. The two or more uplinks include a LAN uplink coupled to a LAN and a SAN uplink coupled to a SAN. The traffic splitter prevents SAN traffic from reaching the LAN via the LAN uplink. In addition, the traffic splitter prevents LAN traffic from reaching the SAN via the SAN uplink.

Description

A core-edge network deployment's design typically includes a single LAN coupled to two separate SANs. In a typical core-edge network deployment's design, I/O consolidation is desirable at the access layer (e.g., layer 2), but the core layer remains distinct. For example, in current network deployments, SANs are managed separately and are isolated from the LAN.

LAN traffic may include traffic conforming to a first protocol such as Ethernet, while SAN traffic may include traffic conforming to a second protocol such as Fibre Channel (FC). It is possible to use a common physical medium such as Ethernet networks to transport both the LAN and the SAN traffic. Specifically, Fibre Channel over Ethernet (FCoE) is a standard for using the Fibre Channel protocol over Ethernet networks, enabling FCoE to be used to transport SAN traffic. FCoE typically uses Ethernet cards, cables, and switches to route FC traffic at the link layer, and uses Ethernet to transmit the FC traffic. FCOE technology provides various advantages over other technologies, including lower operating costs and power utilization.

Many undesirable effects may result from SAN traffic leaking into the LAN, as well as LAN traffic leaking into the SAN. Traffic leaking from a LAN to a SAN or vice versa may result from broadcast or unicast traffic. For instance, malicious hosts may send unicast traffic using the identity of other hosts. While we would like to segregate the two types of traffic (e.g., SAN and LAN traffic), it would be desirable to use a common physical media to support both SAN and LAN traffic. Thus, in one embodiment, the networks may be Ethernet networks, enabling FCoE to be used to transport FC traffic. Specifically, the servers (e.g., hosts) and networking switches may be Ethernet switches.

Different traffic characteristics are often associated with each type of traffic. These characteristics may include abilities like drop/no drop behavior, different flow control conditions or requirements, etc. For instance, LAN broadcast traffic is generally processed by the network device that receives the broadcast traffic, even if the network device is not the intended destination. This can be problematic for SAN network devices (e.g., switches) that receive LAN broadcast traffic. It would therefore be beneficial to guarantee that a particular traffic type does not leak into an uplink towards a targeted destination for another traffic type.

Virtual LANs (VLANs) also provide basic broadcast isolations, but this typically requires that an end host be capable of VLAN tagging and be aware of the correct VLAN to use for different traffic types. Moreover, when merging a LAN and a SAN through I/O consolidation in existing deployments, it may not be possible to assign unique VLAN tags for different traffic types. As a result, even if traffic for two different traffic types may be intended for two different uplinks, the VLAN tag may be the same for the traffic for both traffic types.

The disclosed embodiments provide traffic segregation techniques that may be implemented to segregate traffic of different traffic types. In one embodiment, traffic segregation techniques may be applied at a network device such as a switch (or router) coupled to a LAN and SAN. For example, the switch may be an access switch or a distribution switch having multiple "links." Links that are coupled to the LAN and SAN may be referred to as uplinks, while links that are coupled to network devices (e.g, hosts) communicating with the LAN or SAN may be referred to as downlinks. Traffic isolation may be achieved via various techniques described below by a traffic segregating network device, which may be referred to as a Traffic Splitter.

Various embodiments of the invention support traffic isolation of LAN and SAN (e.g., FCoE based SAN) networks. Specifically various embodiments of the invention may prevent one type of I/O consolidated traffic from adversely impacting another type of traffic. Example systems in which various embodiments may be implemented will be described below with reference to FIGS. 1-3.

FIG. 1 is a block diagram illustrating an example system in which various embodiments may be implemented. In this example, a Traffic Splitter 102 is coupled to a LAN 104 and a SAN 106. In this example, the Traffic Splitter 102 is coupled to the LAN 104 via a first switch 108 and coupled to the SAN 106 via a second switch 110. The LAN 104 may be an Ethernet LAN and the SAN 106 may be a FC or FCoE based SAN. Therefore, the first switch 108 may be an Ethernet switch, while the second switch 110 may be a FC/FCoE switch.

The Traffic Splitter 102 may be coupled to two different uplinks. A first uplink 112 may support the transmission of LAN traffic between the Traffic Splitter 102 and the LAN 104. A second uplink 114 may support the transmission of SAN traffic between the Traffic Splitter 102 and the SAN 106. Specifically, the LAN traffic may be Internet Protocol over Ethernet (IPoE) traffic, while the SAN traffic may be FCoE traffic. This may be accomplished by implementing both the first uplink 112 and the second uplink 114 in a common physical media. For example, both the first uplink 112 and the second uplink 114 may be Ethernet links. Thus, the first uplink 112 and the second uplink may both carry Ethernet traffic.

The Traffic Splitter 102 may be further coupled to one or more network devices 115, which may be I/O consolidated hosts, via one or more downlinks 116. Each of the downlinks 116 may be implemented in a common physical media. For example, the downlinks 116 may be Ethernet links. Thus, the downlinks 116 may each carry Ethernet traffic.

An I/O consolidated host may be capable of receiving and/or transmitting two or more types of traffic (e.g., SAN and LAN traffic). Specifically, an I/O consolidated host may be a network device having a plurality of ports. Each of the ports may support the receiving and/or transmitting of at least one of these two types of traffic. More specifically, one or more ports of an I/O consolidated host may support the receipt and/or transmission of two or more types of traffic. Of course, one or more ports of an I/O consolidated host may be dedicated to a particular type of traffic (e.g., SAN or LAN traffic). For example, a first set of ports of the I/O consolidated host may be dedicated to sending and/or receiving Fibre Channel traffic, while a second set of ports of the I/O consolidated host may be dedicated to sending and/or receiving IP traffic.

The downlinks 116 may support the transmission of I/O consolidated traffic between the Traffic Splitter 102 and the network devices 115. Specifically, each of the downlinks 116 may support the transmission of two or more types of traffic, which may be referred to as consolidated I/O traffic. For instance, each of the downlinks may support the transmission of both SAN and LAN traffic.

The Traffic Splitter 102 may be a network device that is capable of performing switching or routing functions. In this example, the Traffic Splitter 102 is an Ethernet Switch.

The use of a traffic splitter also makes it possible to create redundant networks for certain types of traffic. For example, SANs are typically deployed in dual-fabrics to provide full fault-tolerance and isolation without any single point of failure. I/O consolidation in the network would normally aggregate all traffic into I/O consolidated uplinks. A traffic splitter solution allows topologies with two different completely isolated SAN networks which still have a single common LAN network, as will be described in further detail below with reference to FIG. 2.

Figure 2:
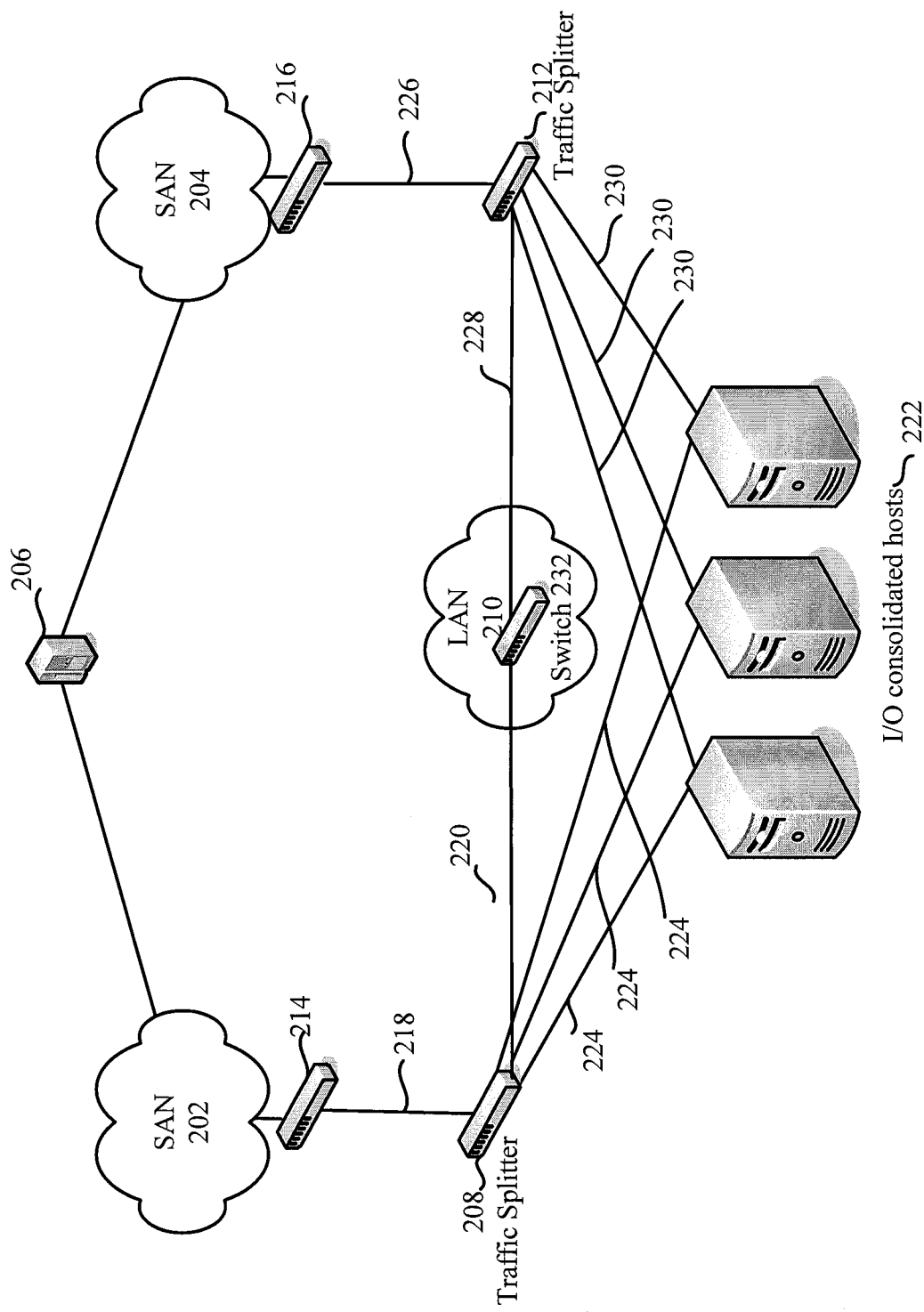
FIG. 2 is a block diagram illustrating another example system in which various embodiments may be implemented.

FIG. 2 is a block diagram illustrating another example system in which various embodiments may be implemented. In this example, two different SANs are coupled to the same data storage devices. Specifically, a first SAN 202, SAN A, and a second SAN 204, SAN B, are both coupled to a target 206. The system includes two different traffic splitters corresponding to the two different SANs 202, 204. As shown, a first Traffic Splitter 208 is coupled to the first SAN 202 and a LAN 210, while a second Traffic Splitter 212 is coupled to the second SAN 204 and the LAN 210. In this manner, two different traffic splitters coupled to independent SANs can be coupled to one another via a single LAN.

In this example, the first Traffic Splitter 208 is coupled to the first SAN 202 via a first switch 214. Similarly, the second Traffic Splitter 212 is coupled to the second SAN 204 via a second switch 216. The LAN 210 may be an Ethernet LAN and both of the SANs 202, 204 may each be a FC or FCoE based SAN. Therefore, the first switch 214 and the second switch 216 may each be a FCoE switch.

As set forth above, each of the Traffic Splitters 208, 212 may be coupled to two different uplinks. With reference to the first Traffic Splitter 208, a first uplink 218 may support the transmission of SAN traffic between the first Traffic Splitter 208 and the first SAN 202. Similarly, a second uplink 220 may support the transmission of LAN traffic between the first Traffic Splitter 208 and the LAN 210. The LAN traffic may be IP traffic, while the SAN traffic may be FCoE traffic.

The first Traffic Splitter 208 may be further coupled to one or more network devices 222, which may be I/O consolidated hosts, via one or more downlinks 224. The downlinks 224 may support the transmission of I/O consolidated traffic between the first Traffic Splitter 208 and the network devices 222. Specifically, each of the downlinks 224 may support the transmission of two or more types of traffic, which may be referred to as consolidated I/O traffic. For instance, each of the downlinks may support the transmission of both SAN and LAN traffic.

With reference to the second Traffic Splitter 212, a first uplink 226 may support the transmission of SAN traffic between the second Traffic Splitter 212 and the second SAN 204. Similarly, a second uplink 228 may support the transmission of LAN traffic between the second Traffic Splitter 212 and the LAN 210. The LAN traffic may be IP traffic, while the SAN traffic may be Fibre Channel (e.g., FCoE) traffic.

The second Traffic Splitter 212 may be further coupled to the network devices 222, which may be I/O consolidated hosts, via one or more downlinks 230. The downlinks 230 may support the transmission of I/O consolidated traffic between the second Traffic Splitter 212 and the network devices 222. Specifically, each of the downlinks 230 may support the transmission of two or more types of traffic. For instance, each of the downlinks 230 may support the transmission of both SAN and LAN traffic.

Both the first Traffic Splitter 208 and the second Traffic Splitter 212 may be coupled to the LAN 210 via one or more network devices (e.g., routers and/or switches). In this example, the first Traffic Splitter 208 and the second Traffic Splitter 212 are coupled to the LAN via a switch 232 such as an Ethernet switch.

The Traffic Splitters 208, 212 may each be a network device that is capable of performing switching or routing functions. In this example, the Traffic Splitters 208, 212 are Ethernet Switches.

In addition to enabling the creation of highly-available redundant dual SAN configurations as described above, traffic splitting may provide the benefit of restricting device visibility across segregated links. Consider the following diagram, which is a variation of the dual-SAN/single LAN topology.

Figure 3:
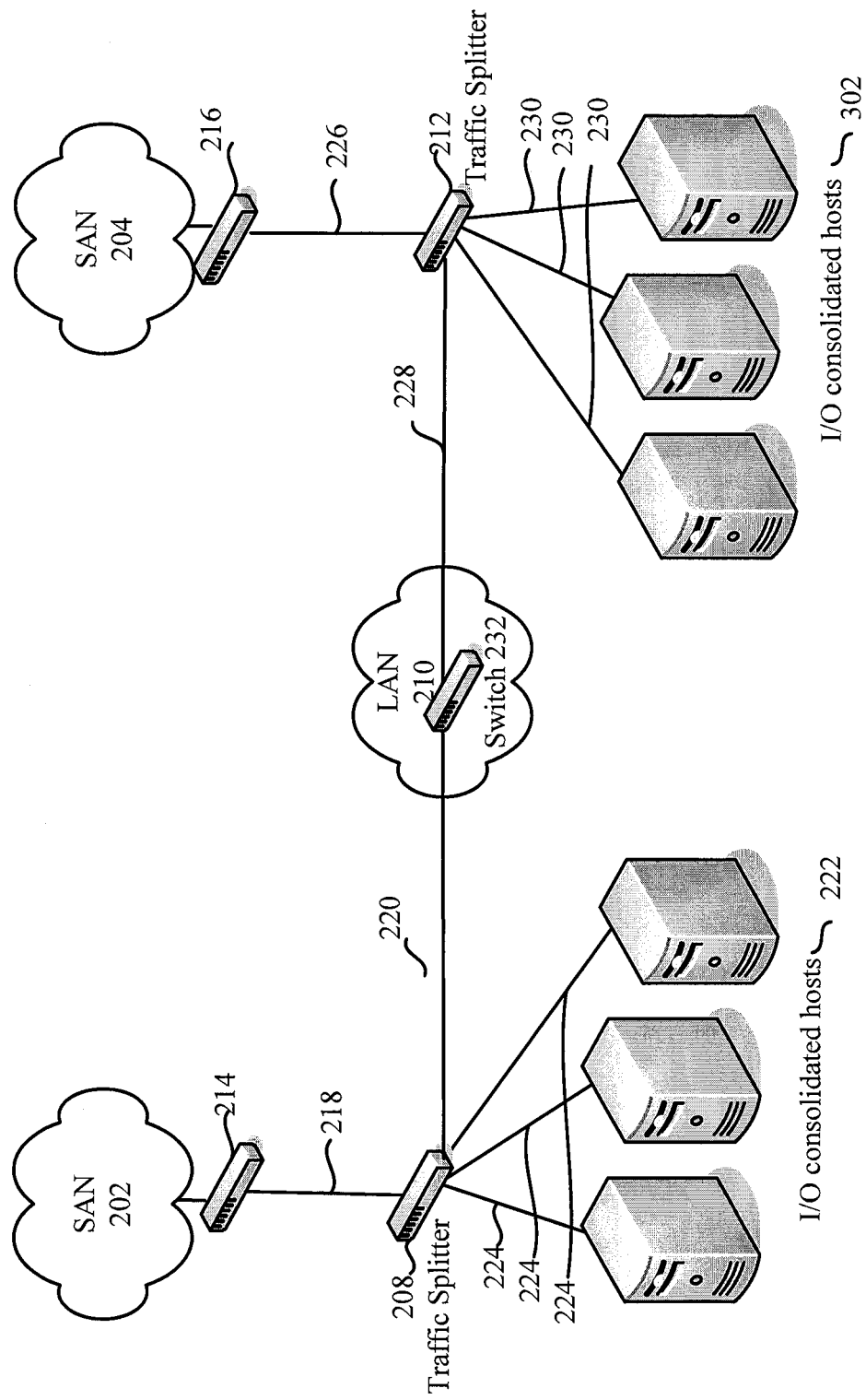
FIG. 3 is a block diagram illustrating another example system in which various embodiments may be implemented.

FIG. 3 is a block diagram illustrating another example system in which various embodiments may be implemented. This system includes two different Traffic Splitters 208, 212, as described above with reference to FIG. 2. However, in this example, the second Traffic Splitter 212 is coupled to a different set of one or more network devices 302 (e.g., I/O consolidated hosts) from the first Traffic Splitter 208. Specifically, I/O consolidated hosts 1 coupled to the first SAN 202, SAN A, are shown at 222, while I/O consolidated hosts 2 coupled to the second SAN 204, SAN B, are shown at 302. Thus, this system is a non-redundant configuration with two separate SANs and a single LAN. Without the Traffic Splitter 212 at the access layer, I/O consolidated hosts 1 222 would be able to connect and talk to SAN B 204, while they may need connectivity only to SAN A 202. Unfortunately, traffic intended for SAN A may therefore leak into SAN B. Note that VLAN based separation of traffic between SAN A and SAN B may not be feasible in this scenario because the I/O consolidated hosts may want to use the same VLAN on links 224 and 230. Even if it were feasible for SAN traffic for SAN A and SAN B to be divided by associating the two different SANs with distinct VLANs, some constraints (e.g., VLAN discovery protocol in FCoE) may force common VLAN traffic to be carried across the uplinks 220 and 228.

A variety of mechanisms for segregating traffic may be implemented by a traffic splitter. Example methods of segregating traffic that may be implemented by a traffic splitter will be described below with reference to FIGS. 4-5.

Figure 4:
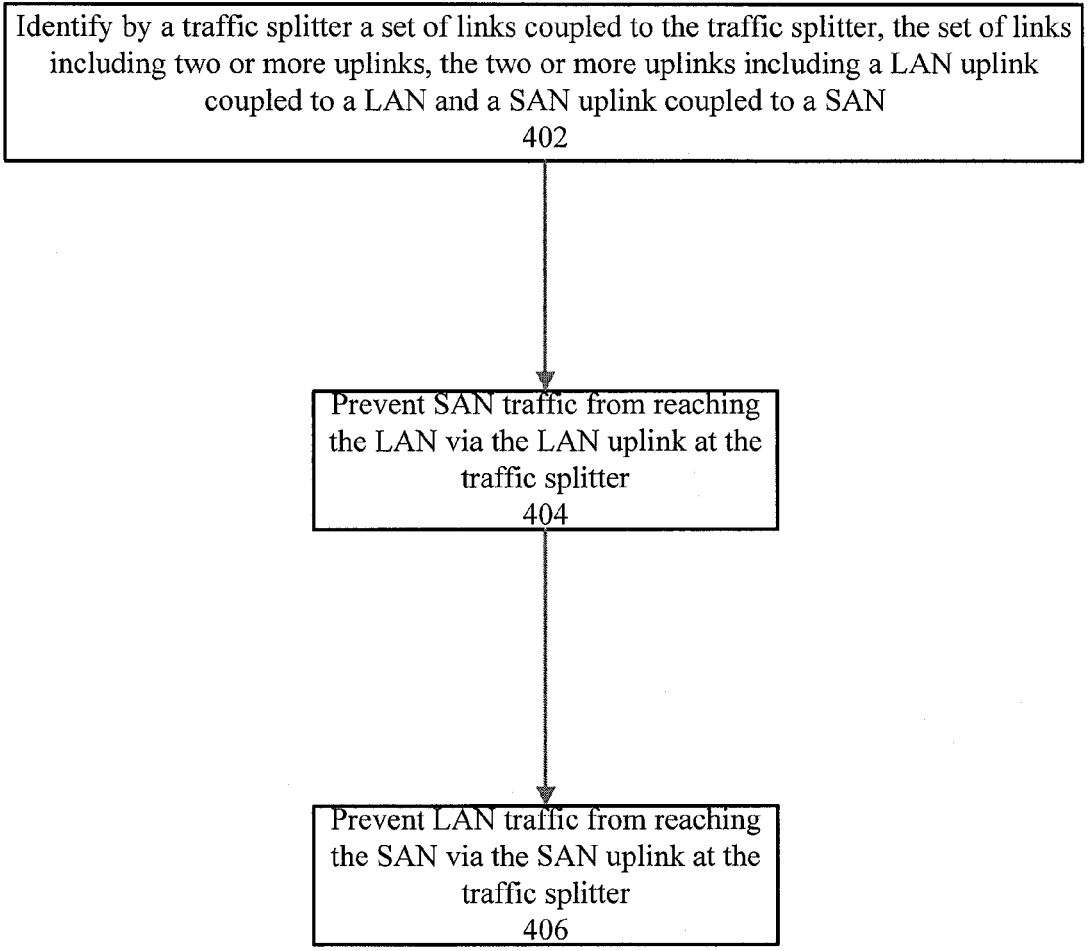
FIG. 4 is a process flow diagram illustrating an example method of segregating traffic in accordance with various embodiments of the invention.

FIG. 4 is a process flow diagram illustrating an example method of segregating traffic in accordance with various embodiments of the invention. A traffic splitter may identify a set of links coupled to the traffic splitter at 402. The set of links may include two or more uplinks, where the two or more uplinks include a LAN uplink coupled to a LAN and a SAN uplink coupled to a SAN. The set of links may also include one or more downlinks, which may be coupled to one or more network devices (e.g., hosts).

The traffic splitter may prevent SAN traffic from reaching the LAN via the LAN uplink at 404. The SAN traffic may be received from the SAN or from one or more hosts. Thus, the traffic splitter may prevent SAN traffic transmitted by the SAN from reaching the LAN by blocking traffic received via the SAN uplink from reaching the LAN via the LAN uplink. In addition, the traffic splitter may also identify a set of ports via which SAN traffic (e.g., Fibre Channel traffic) can be processed (e.g., transmitted and/or received) by the hosts coupled to the downlinks. Each of the set of ports may be identified by a port identifier and corresponding Media Access Control (MAC) address. The traffic splitter may therefore block traffic sent by the set of ports from being transmitted via the LAN uplink to destinations associated with the LAN.

Similarly, the traffic splitter may prevent LAN traffic from reaching the SAN via the SAN uplink at 406. The LAN traffic may be received from the LAN or from one or more hosts. Specifically, the traffic splitter may block traffic received via the LAN uplink from reaching the SAN via the SAN uplink. In addition, as set forth above, the traffic splitter may also identify a set of ports via which SAN traffic (e.g., Fabric Channel traffic) can be processed by the hosts coupled to the downlinks, where each of the set of ports may be identified by a port identifier and corresponding MAC address. The traffic splitter may therefore block traffic sent by ports that are not in the identified set of ports from being transmitted via the SAN uplink.

The disclosed embodiments prevent network devices from sending the wrong traffic type (e.g., SAN traffic or LAN traffic) by accident or maliciously. Specifically, SAN traffic (e.g., FC traffic) addressed to network devices in the LAN may be blocked. Similarly, LAN traffic (e.g., Ethernet traffic) addressed to network devices in the SAN may be blocked. This may be performed using Access Control Lists (ACLs) and/or static MAC entries that block undesired traffic, as will be described in further detail below with reference to FIG. 5.

Figure 5:
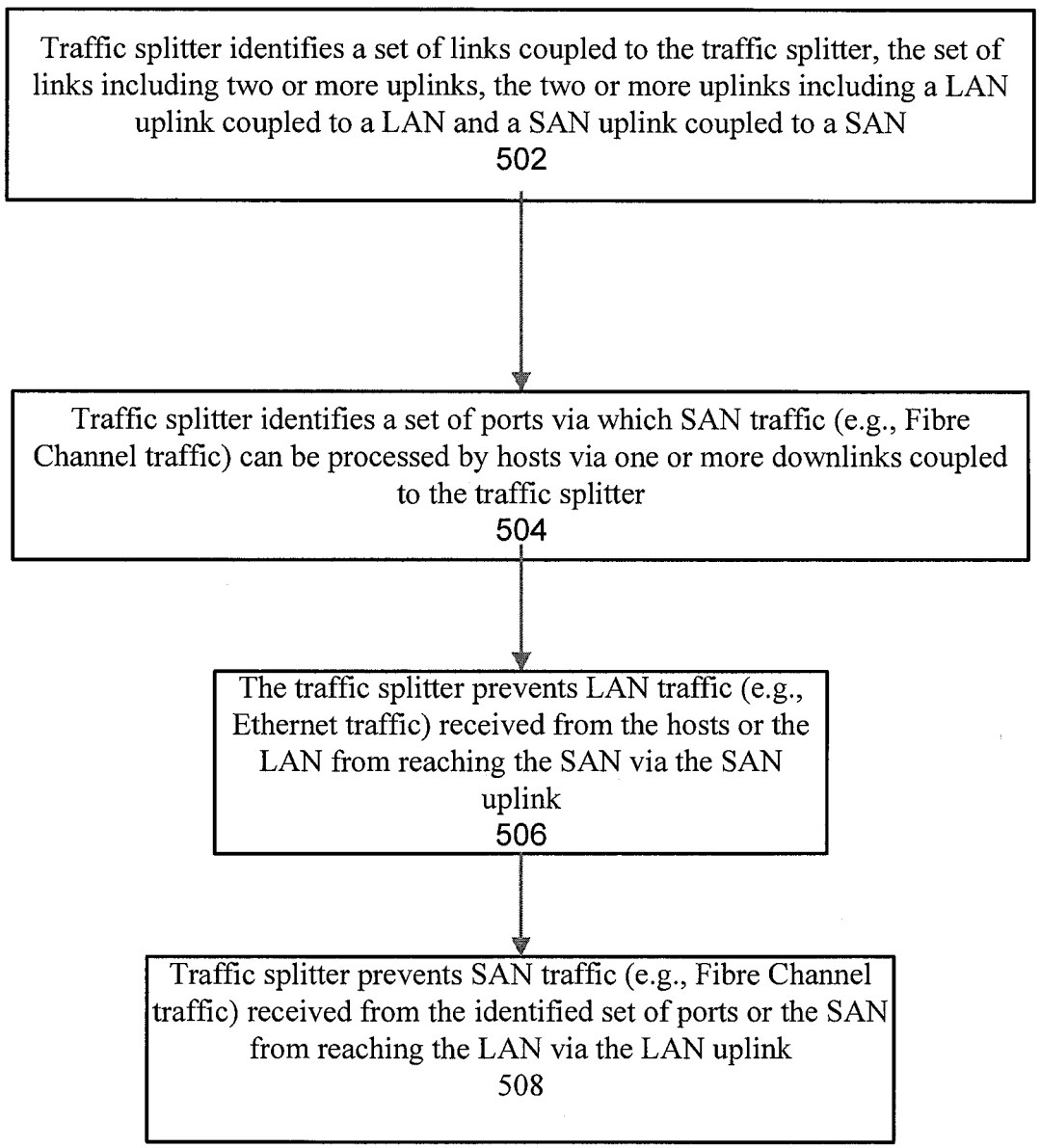
FIG. 5 is a process flow diagram illustrating an example method of segregating traffic in a traffic splitter coupled to a SAN network and a LAN network in accordance with various embodiments.

FIG. 5 is a process flow diagram illustrating an example method of segregating traffic in a traffic splitter coupled to a SAN network and a LAN network in accordance with various embodiments. The traffic splitter may identify a set of links (e.g., uplinks) coupled to the traffic splitter at 502. Moreover, the traffic splitter may identify unique uplinks for different types of traffic (e.g., SAN traffic or LAN traffic). Specifically, the set of links may be statically configured at the traffic splitter. Alternatively, the traffic splitter may automatically detect the set of links (e.g., uplinks) via automated uplink identification by means of a protocol such as Data Center Bridging Exchange (DCBX) Protocol. The DCBX protocol may carry an identifier for a network to be isolated. For example, the DCBX protocol may carry the identifier via a FC-MAP attribute field in FCoE. The set of links may include two or more uplinks, which may include a LAN uplink coupled to a LAN and a SAN uplink coupled to a SAN. In addition, the traffic splitter may have one or more downlinks via which one or more hosts may send or receive traffic.

The traffic splitter may save the identity of the SAN and/or LAN uplinks (e.g., ports of switches or routers coupled to the SAN and/or LAN) in the form of static MAC entries (or in an ACL) or in order to filter traffic accordingly. For example, the identity of a SAN uplink may be stored in an ACL entry or as a static MAC entry. Similarly, the identity of a LAN uplink may be stored in an ACL entry or as a static MAC entry. The information stored in such an ACL or static MAC entry may be a MAC address and/or port identifier. The identities of the LAN and SAN uplinks may be subsequently used in order to prevent LAN traffic from being transmitted via the SAN uplink, as well as to prevent SAN traffic from being transmitted via the LAN uplink, as will be described in further detail below.

The traffic splitter may also identify a set of ports via which SAN traffic (e.g., Fibre Channel traffic) can be processed (e.g., transmitted or received) by hosts coupled to the one or more downlinks at 504. Each of the set of ports may be identified by a port identifier and/or corresponding MAC address. In one embodiment, the traffic splitter may parse FCoE control frames (e.g., transmitted to or from the hosts) to learn the MAC address and/or port address of the ports (or hosts) that have performed a Fabric login. FCoE control frames may be identified as FCoE Initialization Protocol (FIP) ethertype frames, while the rest of the ethertypes belong to the classical Ethernet LAN network.

Upon learning the identity of the ports (or hosts) that are capable of receiving and/or transmitting SAN traffic (e.g., those ports that have performed a Fabric login), the traffic splitter may store this information by generating static MAC entries or by generating entries in an access control list (ACL) to indicate that SAN traffic (e.g., FC traffic) may be transmitted to or from these ports/hosts. In other words, these static MAC entries and/or ACL entries may indicate that LAN traffic (e.g., Ethernet traffic) cannot be transmitted to or from these ports/hosts. The traffic splitter may subsequently use the static MAC entries and/or ACL entries to detect 'authorized' traffic and control device visibility.

As described with reference to 502 and 504, the traffic splitter may identify MAC addresses and corresponding port identifiers of network devices that are capable of receiving and/or transmitting SAN traffic. For instance, the SAN network devices may include hosts and switches (or routers). The traffic splitter may then store the MAC addresses and corresponding port identifiers of the SAN network devices/ports as static MAC entries and/or ACL entries.

As the traffic splitter receives traffic (e.g., packets or frames) from the LAN, the SAN, or other network devices (e.g., hosts), the traffic splitter may look at a header of the packet/frame in order to filter traffic, as appropriate (e.g., using the static MAC entries and/or ACL entries). Specifically, the traffic splitter may obtain header information such as a source address (e.g., MAC address and/or IP address), a source port, a destination address (e.g., MAC address and/or IP address), and/or a destination port from the packet frame/header. The traffic splitter may then segregate the traffic as it is received using at least a portion of the header information as set forth below with reference to steps 506 and 508.

The traffic splitter may prevent LAN traffic (e.g., Ethernet traffic) received from the hosts or the LAN from reaching the SAN via the SAN uplink at 506. Specifically, the traffic splitter may ascertain from the destination IP address of the header that the frame/packet is a destination unknown unicast or multicast frame/packet. Where a frame/packet is a destination unknown unicast or multicast frame/packet, the frame/packet can be definitively identified as an Ethernet packet. Thus, when the destination address is a destination unknown unicast address or a multicast address, the traffic splitter may prevent the frame/packet from being transmitted via the SAN uplink. Specifically, the traffic splitter may prevent LAN traffic from reaching the SAN via the SAN uplink by filtering destination unknown unicast traffic and multicast traffic via a Spanning Tree Protocol (STP) or an Access Control List (ACL). For instance, an entry in the ACL may indicate that Ethernet traffic cannot be transmitted on the identified SAN uplink. More specifically, the ACL may indicate that destination unknown unicast traffic and/or multicast traffic cannot be transmitted on the identified SAN uplink.

The traffic splitter may also ascertain from at least a portion of the header information whether the frame/packet can be transmitted to a destination in a SAN. This may be accomplished using one or more ACLs and/or static MAC entries. Specifically, the traffic splitter may ensure that a packet/frame that is addressed to a SAN network device or port is also transmitted by a port that has been identified as being capable of transmitting SAN traffic (e.g., that has performed a Fabric login). Where the frame/packet is addressed to a SAN link or port, the traffic splitter may determine whether the source port (e.g., MAC address and port identifier) identifies a port via which SAN traffic can be processed (e.g., that has performed a Fabric login). This may be accomplished using an ACL or static MAC entries. For example, the traffic splitter may check whether the source of the frame/packet is identified in one of the static MAC entries or ACL entries as being capable of transmitting SAN traffic. In this manner, the traffic splitter may prevent traffic received from ports that are not in the identified set of ports (e.g., having MAC addresses and corresponding port identifiers) from being transmitted via the SAN uplink.

In addition, the traffic splitter may prevent SAN traffic (e.g., Fibre Channel traffic) received from the identified set of ports (e.g., having MAC addresses and corresponding port identifiers) or the SAN from reaching the LAN via the LAN uplink at 508. This may be accomplished using static MAC entries and/or ACL entries that were previously generated, as described above. Specifically, the traffic splitter may block a packet/frame that is received via the identified SAN uplink or from a port that has previously been identified as being capable of transmitting SAN traffic (e.g., by performing a Fabric login) from being transmitted via the LAN uplink.

VLAN tagging may be performed in order to perform traffic splitting. However, VLAN tagging at individual hosts typically involves significant management overhead. Moreover, performing VLAN tagging at the individual hosts does not address the topic of preventing rogue host attacks.

In accordance with various embodiments, the traffic splitter may enable traffic to be split by inserting a VLAN identifier into a packet/frame or modifying an existing VLAN identifier in a packet/frame. Where a packet/frame is received (e.g., from a host), the packet/frame may include a VLAN identifier. The traffic splitter may insert a VLAN identifier or modify an existing VLAN identifier such that a first VLAN identifier corresponds to a first type of traffic (e.g., SAN traffic), while a second VLAN identifier corresponds to a second type of traffic (e.g., LAN traffic). Moreover, the traffic splitter may insert a VLAN identifier or modify an existing VLAN identifier such that two different SANs are identified by two different VLAN identifiers. In this manner, the traffic splitter may segregate traffic with minimal management overhead.

The traffic splitter may also perform load balancing for a particular traffic type (e.g., SAN traffic or LAN traffic). For example, in order to perform load balancing for SAN traffic associated with a SAN, two FCoE core switches coupled to the SAN could be connected to the traffic splitter. In this case, the traffic could be optionally load balanced between the two switches. Specifically, the traffic splitter may track the load on the two different SAN switches. The traffic splitter may track the load by tracking the number of Fibre Channel logins performed via the two different SAN switches. The traffic splitter may also track the load by tracking the number of packets transmitted via the two different SAN switches. End hosts are unaware that the traffic splitter is doing any traffic splitting on its behalf.

The disclosed embodiments support the use of one or more traffic splitters to selectively and seamlessly segregate I/O consolidated classical Ethernet LAN and FCoE SAN traffic at access/distribution layers to separate destinations in uplink distribution/core layers. The segregation may be achieved by identifying devices (e.g., ports) and paths to the two different networks, and sending traffic only to the appropriate uplink. Within a traffic splitter, the traffic may be isolated using different techniques such as static MACs, ACLs and/or control traffic snooping.

Allowing traffic meant for a SAN to flow to a destination in a LAN and vice versa can lead to the suboptimal use of network resources and raises security concerns. Traffic splitting provides an elegant way of optimizing network throughput into distribution/core uplinks. In addition, traffic splitting addresses the security concerns that could not otherwise be addressed.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment of this invention, the techniques of the disclosed embodiments are implemented in software such as an operating system or in an application running on an operating system.

A software or software/hardware hybrid packet processing system of this invention may be implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. A general architecture for some of these machines will appear from the description given below. Further, various embodiments may be at least partially implemented on a card (e.g., an interface card) for a network device or a general-purpose computing device.

Figure 6:
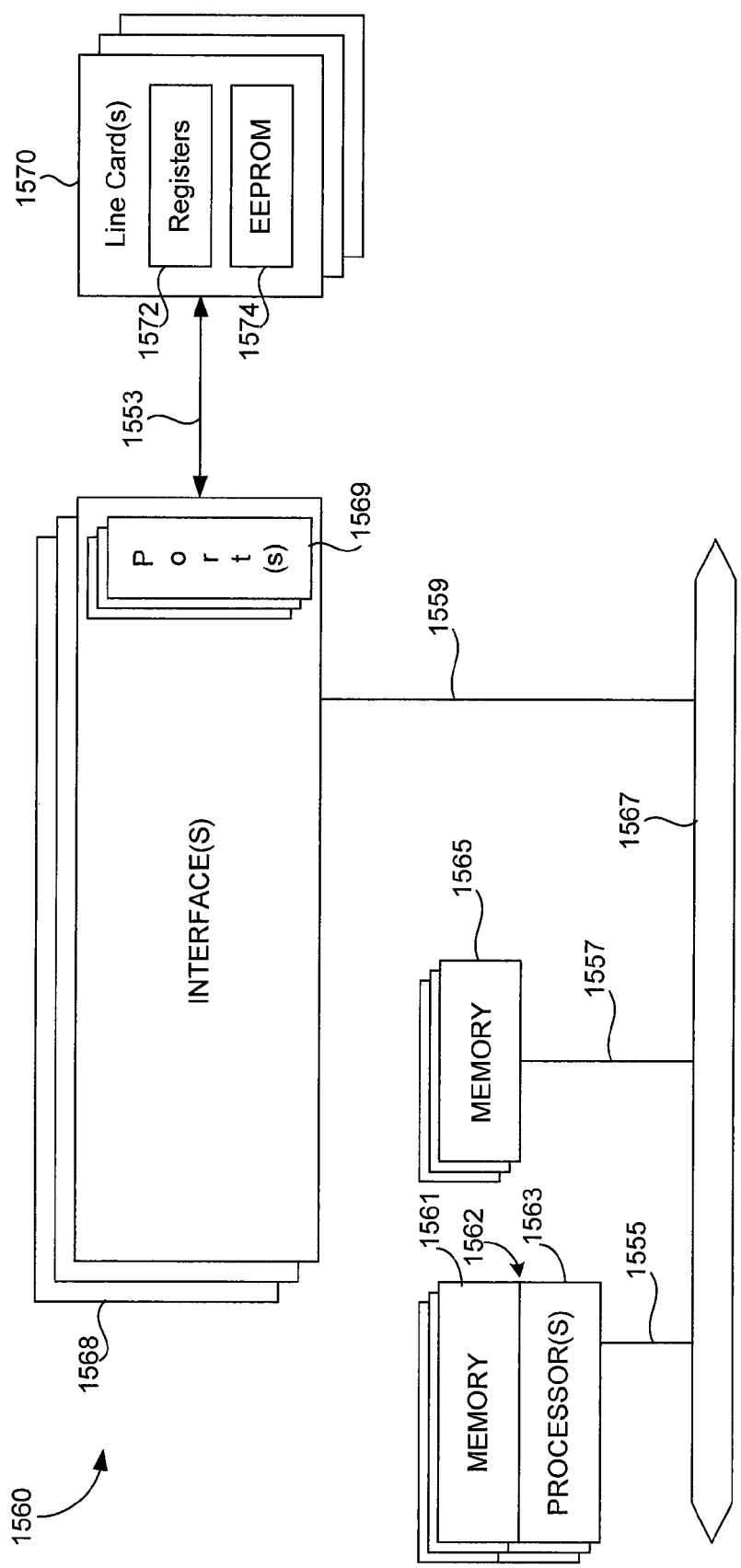
FIG. 6 is a diagrammatic representation of an example network device in which various embodiments may be implemented.

The disclosed embodiments may be implemented at network devices such as switches or routers. Referring now to FIG. 6, a router or switch 710 suitable for implementing embodiments of the invention includes a master central processing unit (CPU) 762, interfaces 768, and a bus 715 (e.g., a PCI bus). When acting under the control of appropriate software or firmware, the CPU 762 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 762 may include one or more processors 763 such as a processor from the Motorola family of microprocessors or the MIPS family of microprocessors. In an alternative embodiment, processor 763 is specially designed hardware for controlling the operations of router 10. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets or data segments over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, LAN interfaces, WAN interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc. Although the system shown in FIG. 6 is one specific router of the disclosed embodiments, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 765) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

The invention claimed is:
1. A method, comprising:
  identifying by a traffic splitter a set of links coupled to the traffic splitter, the set of links including two or more uplinks, the two or more uplinks including a LAN uplink coupled to a LAN and a SAN uplink coupled to a SAN, wherein each of the two or more uplinks is implemented in a common physical medium;
  preventing SAN traffic from reaching the LAN via the LAN uplink; and
  preventing LAN traffic from reaching the SAN via the SAN uplink;
  wherein the steps of preventing SAN traffic from reaching the LAN via the LAN uplink and preventing LAN traffic from reaching the SAN via the SAN uplink are performed by the traffic splitter and include:
    receiving a packet from a host, wherein the packet includes a VLAN identifier; and modifying the VLAN identifier such that the VLAN identifier identifies a VLAN that carries SAN traffic or LAN traffic, wherein modifying the VLAN identifier includes modifying the VLAN identifier such that the VLAN identifier is a first VLAN identifier corresponding to SAN traffic or a second VLAN identifier corresponding to LAN traffic.

2. The method as recited in claim 1, wherein the SAN traffic is received from the SAN via the SAN uplink or from one or more hosts via one or more downlinks coupled to the traffic splitter.

3. The method as recited in claim 1, wherein the LAN traffic is received from the LAN via the LAN uplink or from one or more hosts via one or more downlinks coupled to the traffic splitter.

4. The method as recited in claim 1, wherein the SAN traffic includes Fibre Channel traffic.

5. The method as recited in claim 1, wherein identifying by a traffic splitter a set of links coupled to the traffic splitter comprises:
parsing FCoE control frames.

6. The method as recited in claim 5, wherein the FCoE control frames are FIP ethertype frames.

7. The method as recited in claim 1, wherein preventing LAN traffic from reaching the SAN via the SAN uplink comprises:
filtering destination unknown unicast and multicast traffic.

8. The method as recited in claim 7, wherein filtering destination unknown unicast and multicast traffic is performed via a Spanning Tree Protocol (STP).

9. The method as recited in claim 7, wherein filtering destination unknown unicast and multicast traffic is performed via an Access Control List (ACL).

10. The method as recited in claim 1, wherein modifying the VLAN identifier comprises:
modifying the VLAN identifier such that the VLAN identifier is a first VLAN identifier corresponding to a first SAN or a second VLAN identifier corresponding to a second SAN.

11. A method, comprising:
identifying by a traffic splitter a set of links coupled to the traffic splitter, the set of links including two or more uplinks and one or more downlinks, each of the downlinks being coupled to one or more hosts, the two or more uplinks including a LAN uplink coupled to a LAN and a SAN uplink coupled to a SAN, wherein each of the two or more uplinks is implemented in a common physical medium;
identifying by the traffic splitter a set of ports via which Fabric Channel traffic can be processed by the hosts, each of the set of ports being identified by a port identifier and corresponding MAC address; and
preventing by the traffic splitter SAN traffic from reaching the LAN via the LAN uplink, wherein preventing SAN traffic from reaching the LAN via the LAN uplink includes:
blocking traffic having one of a first set of VLAN identifiers from being transmitted via the LAN uplink such that the traffic received via the SAN uplink is prevented from reaching the LAN via the LAN uplink and the traffic sent by the set of ports is prevented from being transmitted via the LAN uplink to destinations associated with the LAN; and
modifying the first set of VLAN identifiers such that the first set of VLAN identifiers identifies a respective VLAN that carries SAN traffic or LAN traffic, wherein modifying the first set of VLAN identifiers includes modifying a VLAN identifier such that the VLAN identifier is a first VLAN identifier corresponding to SAN traffic or a second VLAN identifier corresponding to LAN traffic.

12. The method as recited in claim 11, further comprising:
preventing by the traffic splitter LAN traffic from reaching the SAN via the SAN uplink, wherein preventing LAN traffic from reaching the SAN via the SAN uplink includes:
blocking traffic received via the LAN uplink from reaching the SAN via the SAN uplink; and
blocking traffic sent by ports that are not in the identified set of ports from being transmitted via the SAN uplink.

13. The method as recited in claim 11, further comprising:
marking traffic received via the SAN uplink and traffic sent by the set of ports as having one of a first set of VLAN identifiers such that a VLAN identifier identifies the traffic as being SAN traffic.

14. A method, comprising:
identifying by a traffic splitter a set of links coupled to the traffic splitter, the set of links including two or more uplinks and one or more downlinks, each of the downlinks being coupled to one or more hosts, the two or more uplinks including a LAN uplink coupled to a LAN and a SAN uplink coupled to a SAN, wherein each of the two or more uplinks is implemented in a common physical medium;
identifying by the traffic splitter a set of ports via which Fabric Channel traffic can be processed by the hosts, each of the set of ports being identified by a port identifier and corresponding MAC address;
marking traffic sent by the set of ports such that a VLAN identifier is modified to identify the traffic as being SAN traffic; and
blocking by the traffic splitter traffic having the VLAN identifier from being transmitted via the LAN uplink to destinations associated with the LAN, thereby preventing the SAN traffic sent by the set of ports from being transmitted via the LAN uplink to destinations associated with the LAN.

15. The method as recited in claim 14, further comprising:
blocking traffic sent by ports that are not in the identified set of ports from being transmitted via the SAN uplink.

16. A non-transitory computer-readable medium storing thereon computer-readable instructions, comprising:
instructions for identifying by a traffic splitter a set of links coupled to the traffic splitter, the set of links including two or more uplinks, the two or more uplinks including a LAN uplink coupled to a LAN and a SAN uplink coupled to a SAN, wherein each of the two or more uplinks is an Ethernet link;
instructions for identifying by the traffic splitter a set of ports via which Fibre Channel traffic can be processed by hosts via one or more downlinks coupled to the traffic splitter;
instructions for modifying a VLAN identifier in traffic such that the VLAN identifier is a first VLAN identifier corresponding to LAN traffic or a second VLAN identifier corresponding to SAN traffic;
instructions for blocking, by the traffic splitter, traffic including the first VLAN identifier from reaching the SAN via the SAN uplink such that Ethernet traffic received from the hosts and the LAN is prevented from reaching the SAN via the SAN uplink; and
instructions for blocking, by the traffic splitter, traffic including the second VLAN identifier from reaching the LAN via the LAN uplink such that Fibre Channel traffic received from the identified set of ports and the SAN is prevented from reaching the LAN via the LAN uplink.

17. The non-transitory computer-readable medium as recited in claim 16, wherein the instructions for preventing Fibre Channel traffic from reaching the LAN via the LAN uplink comprises:
instructions for preventing traffic received from the identified set of ports from being transmitted via the LAN uplink.

18. The non-transitory computer-readable medium as recited in claim 16, wherein the instructions for preventing Ethernet traffic from reaching the SAN via the SAN uplink comprises:
instructions for preventing traffic received from ports that are not in the identified set of ports from being transmitted via the SAN uplink.

19. The non-transitory computer-readable medium as recited in claim 16, further comprising:
instructions for performing load balancing with respect to the SAN or the LAN.

20. The non-transitory computer-readable medium as recited in claim 16, further comprising:
instructions for labeling Ethernet traffic received from the hosts such that a VLAN identifier of the Ethernet traffic includes the first VLAN identifier corresponding to LAN traffic; and
instructions for labeling traffic received from the identified set of ports such that a VLAN identifier of the traffic received from the identified sets of ports is a second VLAN identifier corresponding to SAN traffic.

21. An apparatus, comprising:
a processor; and
a memory, at least one of the processor or the memory being adapted for:
identifying a set of links coupled to the traffic splitter, the set of links including two or more uplinks, the two or more uplinks including a LAN uplink coupled to a LAN and a SAN uplink coupled to a SAN, wherein each of the two or more uplinks are implemented in a common physical media;
identifying a set of ports via which SAN traffic can be transmitted or received by hosts via one or more downlinks coupled to the traffic splitter;
modifying a VLAN identifier in traffic such that the VLAN identifier is of a first set of VLAN identifiers corresponding to LAN traffic or of a second set of VLAN identifiers corresponding to SAN traffic;
blocking LAN traffic received via the LAN uplink from reaching the SAN via the SAN uplink by blocking traffic having one of the first set of VLAN identifiers from reaching the SAN via the SAN uplink;
blocking LAN traffic sent by ports of the hosts that are not in the identified set of ports from being transmitted via the SAN uplink by blocking traffic having one of the first set of VLAN identifiers from being transmitted via the SAN uplink;
blocking SAN traffic received via the SAN uplink from reaching the LAN via the LAN uplink by blocking traffic having one of the second set of VLAN identifiers from reaching the LAN via the LAN uplink; and
blocking SAN traffic sent by the identified set of ports from being transmitted via the LAN uplink to destinations associated with the LAN by blocking traffic having one of the second set of VLAN identifiers from being transmitted via the LAN uplink.

22. The apparatus as recited in claim 21, wherein identifying a set of ports comprises:
identifying and storing MAC addresses and corresponding port identifiers of SAN network devices capable of transmitting or receiving SAN traffic.

23. The apparatus as recited in claim 22, further comprising:
preventing LAN traffic from being transmitted to the MAC addresses and corresponding port identifiers of the SAN network devices.

24. The apparatus as recited in claim 22, wherein blocking SAN traffic sent by the identified set of ports from being transmitted via the LAN uplink to destinations associated with the LAN further comprises:
preventing traffic received from the MAC addresses and corresponding port identifiers from being transmitted to the LAN.

25. The apparatus as recited in claim 22, wherein at least a portion of the MAC addresses and corresponding port identifiers are stored by generating static MAC entries.

26. The apparatus as recited in claim 22, wherein at least a portion of the MAC addresses and corresponding port identifiers are stored as one or more entries in an Access Control List (ACL).

27. The apparatus as recited in claim 21, wherein the SAN traffic includes Fibre Channel traffic.

28. The apparatus as recited in claim 21, wherein each of the set of ports is identified by a port identifier and corresponding MAC address, wherein identifying a set of ports comprises identifying the port identifier and corresponding MAC address of each of the set of ports.

29. A method, comprising:
identifying, by a traffic splitter, a set of links coupled to the traffic splitter, the set of links including two or more uplinks, the two or more uplinks including a LAN uplink coupled to a LAN and a SAN uplink coupled to a SAN, wherein each of the two or more uplinks are Ethernet links;
identifying, by the traffic splitter, a set of ports via which Fibre Channel traffic can be processed by hosts via one or more downlinks coupled to the traffic splitter;
modifying, by the traffic splitter, VLAN identifiers in traffic such that each of the VLAN identifiers identifies a packet as being part of LAN traffic or SAN traffic;
preventing, by the traffic splitter, Ethernet traffic received from the hosts and the LAN from reaching the SAN via the SAN uplink by blocking traffic having a VLAN identifier identifying the traffic as LAN traffic from reaching the SAN via the SAN uplink; and
preventing, by the traffic splitter, Fibre Channel traffic received from the identified set of ports and the SAN from reaching the LAN via the LAN uplink by blocking traffic having a VLAN identifier identifying the traffic as SAN traffic from reaching the LAN via the LAN uplink.

* * * * *